United States Patent
Maguire et al.

(10) Patent No.: US 9,762,562 B2
(45) Date of Patent: Sep. 12, 2017

(54) TECHNIQUES FOR MULTI-STANDARD PEER-TO-PEER CONNECTION

(71) Applicant: Facebook, Inc., Menlo Park, CA (US)

(72) Inventors: Yael Maguire, Boston, MA (US); Damian Kowalewski, Sunnyvale, CA (US); Bin Liu, Sunnyvale, CA (US); Wai Davidgeolim Lim, Hong Kong (CN); Caitlin Elizabeth Kalinowski, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 26 days.

(21) Appl. No.: 14/310,085

(22) Filed: Jun. 20, 2014

(65) Prior Publication Data

US 2015/0082382 A1   Mar. 19, 2015

Related U.S. Application Data

(60) Provisional application No. 61/877,704, filed on Sep. 13, 2013.

(51) Int. Cl.
| | |
|---|---|
| *H04L 29/06* | (2006.01) |
| *H04L 29/08* | (2006.01) |
| *H04W 12/06* | (2009.01) |
| *H04W 84/18* | (2009.01) |

(52) U.S. Cl.
CPC .......... *H04L 63/08* (2013.01); *H04L 67/1061* (2013.01); *H04L 67/1091* (2013.01); *H04L 67/18* (2013.01); *H04L 69/18* (2013.01); *H04W 12/06* (2013.01); *H04W 84/18* (2013.01)

(58) Field of Classification Search
CPC ............. H04L 67/1068; H04L 67/1061; H04L 67/1091; H04L 67/104; H04L 67/18; H04L 63/08
See application file for complete search history.

(56) References Cited

U.S. PATENT DOCUMENTS

| | | | | |
|---|---|---|---|---|
| 2003/0021250 | A1* | 1/2003 | Willins | H04L 12/24 370/338 |
| 2006/0248573 | A1* | 11/2006 | Pannu | G06F 21/62 726/1 |
| 2007/0286100 | A1* | 12/2007 | Saaranen | H04L 67/16 370/260 |
| 2009/0164574 | A1* | 6/2009 | Hoffman | H04W 4/02 709/204 |
| 2010/0042668 | A1 | 2/2010 | Liang et al. | |
| 2012/0096352 | A1* | 4/2012 | Maor | H04L 51/32 715/706 |
| 2012/0134349 | A1 | 5/2012 | Jung et al. | |

(Continued)

*Primary Examiner* — Carl Colin
*Assistant Examiner* — Vance Little

(57) ABSTRACT

Techniques for multi-protocol peer-to-peer connection are described. An apparatus may comprise a discovery component to discover a remote device using a first protocol, and receive discovery information from the remote device, the discovery information including protocol information. The apparatus may comprise an authentication component to authenticate the remote device. The apparatus may comprise a connection component to establish a peer-to-peer connection with the remote device using a second protocol based on the protocol information. Other embodiments are described and claimed.

20 Claims, 12 Drawing Sheets

(56) References Cited

U.S. PATENT DOCUMENTS

| | | |
|---|---|---|
| 2012/0281686 A1 | 11/2012 | Pollari |
| 2013/0073671 A1 | 3/2013 | Nagpal et al. |
| 2013/0288595 A1* | 10/2013 | Lee .................. H01F 38/14 |
| | | 455/39 |
| 2014/0150067 A1* | 5/2014 | Salkintzis ............ H04L 67/24 |
| | | 726/4 |

* cited by examiner

200

---

SEND AN INQUIRY MESSAGE FROM A FIRST DEVICE WITH A FIRST PROTOCOL DURING A DISCOVERY PHASE, THE INQUIRY MESSAGE TO DISCOVER A SECOND DEVICE WITHIN COMMUNICATIONS RANGE OF THE FIRST DEVICE, THE INQUIRY MESSAGE TO INCLUDE SOCIAL INFORMATION TO IDENTIFY A USER OF THE FIRST DEVICE AS PART OF A SOCIAL GRAPH OF A SOCIAL NETWORK
202

↓

RECEIVE AN INQUIRY RESPONSE MESSAGE FROM THE SECOND DEVICE WITH THE FIRST PROTOCOL DURING THE DISCOVERY PHASE, THE INQUIRY RESPONSE MESSAGE TO INCLUDE SOCIAL INFORMATION TO IDENTIFY A USER OF THE SECOND DEVICE AS PART OF THE SOCIAL GRAPH OF THE SOCIAL NETWORK, AND A LIST OF SECOND PROTOCOLS FOR USE BY THE SECOND DEVICE
204

↓

AUTHENTICATE A VALID RELATIONSHIP BETWEEN THE FIRST AND SECOND USERS BASED ON THE SOCIAL INFORMATION
206

↓

ESTABLISH A PEER-TO-PEER CONNECTION BETWEEN THE FIRST AND SECOND DEVICES WITH ONE OF THE SECOND COMMUNICATIONS PROTOCOLS DURING A SESSION PHASE WHEN A VALID RELATIONSHIP IS AUTHENTICATED
208

*FIG. 2*

Storage Medium 700

Computer Executable Instructions for 100

Computer Executable Instructions for 200

Computer Executable Instructions for logic 140

*FIG. 7*

TECHNIQUES FOR MULTI-STANDARD PEER-TO-PEER CONNECTION

RELATED APPLICATION

This application claims the benefit of, and priority to, U.S. Provisional Patent Application Ser. No. 61/877,704 titled "Techniques For Multi-Standard Peer-To-Peer Connection" filed on Sep. 13, 2013, the entirety of which is hereby incorporated by reference.

BACKGROUND

Proliferation of electronic devices and connectivity thereof continues to increase at a near exponential rate. While current connectivity paradigms have electronic devices connecting to each other through a centralized network, such as a client device requesting resources provided by central servers, new connectivity paradigms have devices connecting to each other directly via peer-to-peer networks. A peer-to-peer network is a decentralized and distributed network architecture in which individual nodes in the peer-to-peer network (called "peers") act as both suppliers and consumers of resources. A peer-to-peer network typically allows nodes to directly communicate with each other to share resources, such as applications or files, without centralized coordination through servers. As such, peer-to-peer networks are becoming increasingly popular, particularly for those geographic regions where communications bandwidth is relatively scarce or expensive. Techniques to enhance peer-to-peer networks therefore provide significant improvements to users in terms of cost, efficiency and user experience.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for multi-standard peer-to-peer connection of mobile devices. Some embodiments are particularly directed to techniques for peer-to-peer connection that uses a first peer-to-peer standard during a discovery phase to exchange metadata. This metadata may identify mobile devices as owned by peers within a social graph of a social network, for example. Further, this metadata may be used to identify a second peer-to-peer standard that may be used for a peer-to-peer connection. A session phase may be entered using an identified second peer-to-peer standard. In this manner, a first standard, which may provide a simplified discovery process, may be used in a discovery phase, and a second standard, which may provide a more reliable data connection, may be used in a session phase.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 2 illustrates an embodiment of a second logic flow.
FIG. 7 illustrates an embodiment of a computing architecture.

DETAILED DESCRIPTION

Figure 1A:
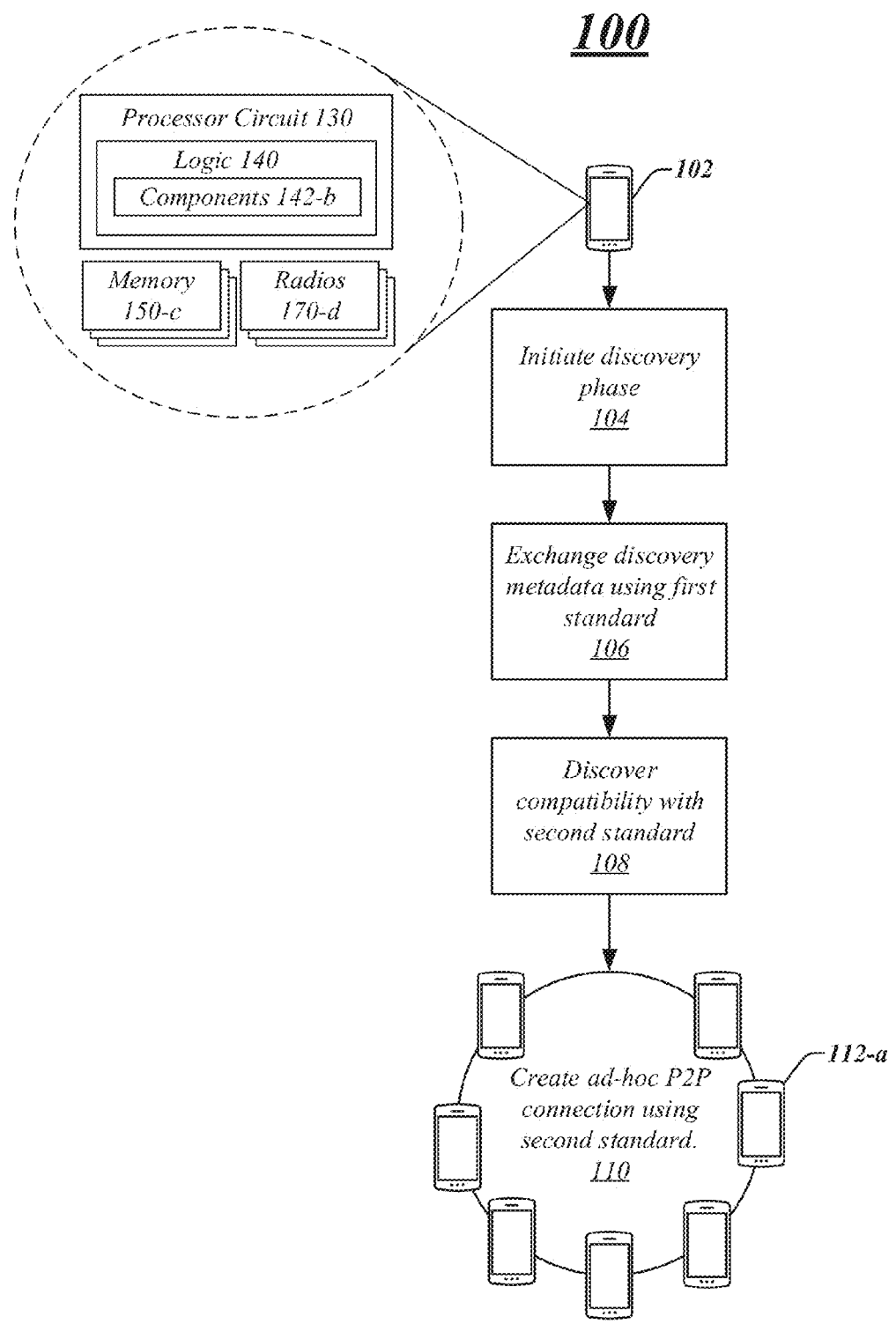
FIG. 1A illustrates an embodiment of a first logic flow.

Various embodiments are generally directed to techniques for multi-standard peer-to-peer connection of mobile devices. Some embodiments are particularly directed to techniques for peer-to-peer connection that uses a first peer-to-peer standard during a discovery phase to exchange metadata. This metadata may identify mobile devices as owned by peers within a social graph of a social network, for example. Further, this metadata may be used to identify a second peer-to-peer standard that may be used for a peer-to-peer connection. A session phase may be entered using an identified second peer-to-peer standard. In this manner, a first standard, which may provide a simplified or shorter discovery process, may be used in a discovery phase, and a second standard, which may provide a faster or more reliable data connection, may be used in a session phase.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 1A illustrates one embodiment of a logic flow 100. The logic flow 100 may be representative of some or all of the operations executed by one or more embodiments described herein. In an embodiment, the logic flow 100 may be implemented by a mobile device 102 and/or one or more mobiles devices 112-a. The mobile device 120 and/or the mobile devices 112 may be implemented as a smartphone, tablet, or other device described with respect to FIG. 5. Mobile device 102 may provide hardware and software compatible with one or more wireless peer-to-peer standards, wireless protocols or other wireless communication technologies, such as, but not limited to, Wi-Fi Direct, Wi-Fi ad hoc, and Bluetooth. Of course, any other wireless standard or protocol capable of providing peer-to-peer connections may be used. As used herein, a standard may be any protocol used for communication between devices, whether formally or informally adopted, or not adopted at all, by a standards setting organization.

Mobile device 102 may include various components to provide computing and communications capabilities. For instance, the mobile device 102 may include a processor circuit 130 capable of executing logic 140. Logic 140 may comprise various hardware and/or software components 142-b. In addition, the mobile device 102 may include one or more memory units 150-c and one or more transceivers 170-d, some or all of which are communicatively coupled to the processor circuit 130. A more detailed block diagram for the mobile device 102 is described with reference to FIG. 1B and FIG. 8. It may be appreciated that the description of mobile device 102 may apply in whole or part to one or more of the mobile devices 112-d.

It is worthy to note that "a" and "b" and "c" and similar designators as used herein are intended to be variables representing any positive integer. Thus, for example, if an implementation sets a value for a=5, then a complete set of mobile devices 112-a may include mobile devices 112-1, 112-2, 112-3, 112-4 and 112-5. The embodiments are not limited in this context.

In any peer-to-peer network, there may be a discovery phase, where peers may discover each other through limited amounts of shared knowledge, a session phase, where a network connection session is established for arbitrary transfer of information, and finally a disconnection phase, where peers may leave the session or cease to be discoverable, and inform their peers. Connection and discovery using peer-to-peer networks, in particular with reference to accessing a social network using tokens, is described further in co-pending application U.S. Ser. No. 13/843,155, which is hereby incorporated by reference.

Logic flow 100 at block 104 initiates a discovery phase for a first peer-to-peer standard. For example, the discovery phase may be used in accordance with the Wi-Fi Direct standard because the Wi-Fi Direct standard may provide for a discovery phase with less operations, thus providing a faster connection that requires minimal, if any, instruction from a user. However, Wi-Fi Direct connections may not provide for reliable data transfer during the session phase, thus, information may be transferred during discovery phase to identify a second peer-to-peer standard. By way of contrast, Wi-Fi ad hoc connections and Bluetooth connections are both stable and reliable, and therefore well-suited for the session phase. Therefore combining Wi-Fi Direct for the discovery phase and Wi-Fi ad hoc or Bluetooth for the session phase preserves the advantages of both while reducing associated disadvantages.

In another example, Bluetooth has time consuming discovery phase operations, with many manual operations, and therefore is not well-suited to discovery phase operations. However, Bluetooth offers flexibility in distance and direction, and reasonably stable and fast connection speeds, and therefore is well-suited for session phase operations. By way of contrast, IrDA has fast discovery phase operations using line-of-sight, making it well-suited for discovery phase operations. However, IrDA needs to maintain line-of-sight for connections, and therefore is not well-suited for session phase operations. Therefore combining IrDA for the discovery phase with Bluetooth for the session phase preserves the advantages of both while reducing associated disadvantages.

These are merely a few examples of the advantages associated with utilizing different protocols for different phases, and others exist as well. Embodiments are not limited to these examples.

In an embodiment, the first peer-to-peer standard may be chosen by the user or an application module on mobile device 102. The first standard may be chosen based upon speed of connection, simplicity of discovery, or other factors such as a number of peers with mobile devices compatible with a first standard. Likewise, a second standard may be chosen for a session phase by the user or an application module on mobile device 102. The second standard may be based upon speed of connection, reliability, ease of connection, or other factors such as a number of peers with mobile devices compatible with a second standard.

Logic flow 100 at block 106 exchanges discovery metadata using a first standard. Metadata exchanged during the discovery phase may represent various users on a social networking system, for example. In addition, metadata may correspond to the robust and quick establishment of a session phase. For example, metadata may include information necessary to establish a data session using a second standard, such as a Wi-Fi access point name, security session key, token, etc. In addition, information exchanged during the discovery phase may include data indicating one or more second standards that may be supported by peers in the vicinity. In one example, a discovery phase may be used to discover Apple® AirDrop® supported peers in the area, while a data session may be initiated using Bluetooth® or Wi-Fi®, providing for cross-platform support among mobile devices.

In an embodiment, if users of a social networking system have previously exchanged tokens or sufficient information to represent their group, they may obtain mutual information over a secure channel using the social networking system (via an application, website, or operating system level commands, rather than discovery phase, for example) to establish a secure local connection and this information may be reusable over a specific period of time to save data costs.

Logic flow 100 at block 108 determines whether a second standard may be used based upon metadata made available using the discovery phase of a first standard. As previously described, a second standard may be chosen for a session phase by the user or an application module on mobile device 102. The second standard may be based upon speed of connection, reliability, ease of connection, or other factors such as a number of peers with mobile devices compatible with a second standard.

Logic flow 100 at block 110 creates an ad hoc peer-to-peer connection with two or more mobile devices using a second standard identified in block 108. In this manner, a data session may take place using a standard different than that used during discovery phase. At the end of a data session, a termination phases may be initiated by one or more mobile devices using either the first or second standard, and each peer in the network may be notified as other peers leave the session.

Figure 1B:
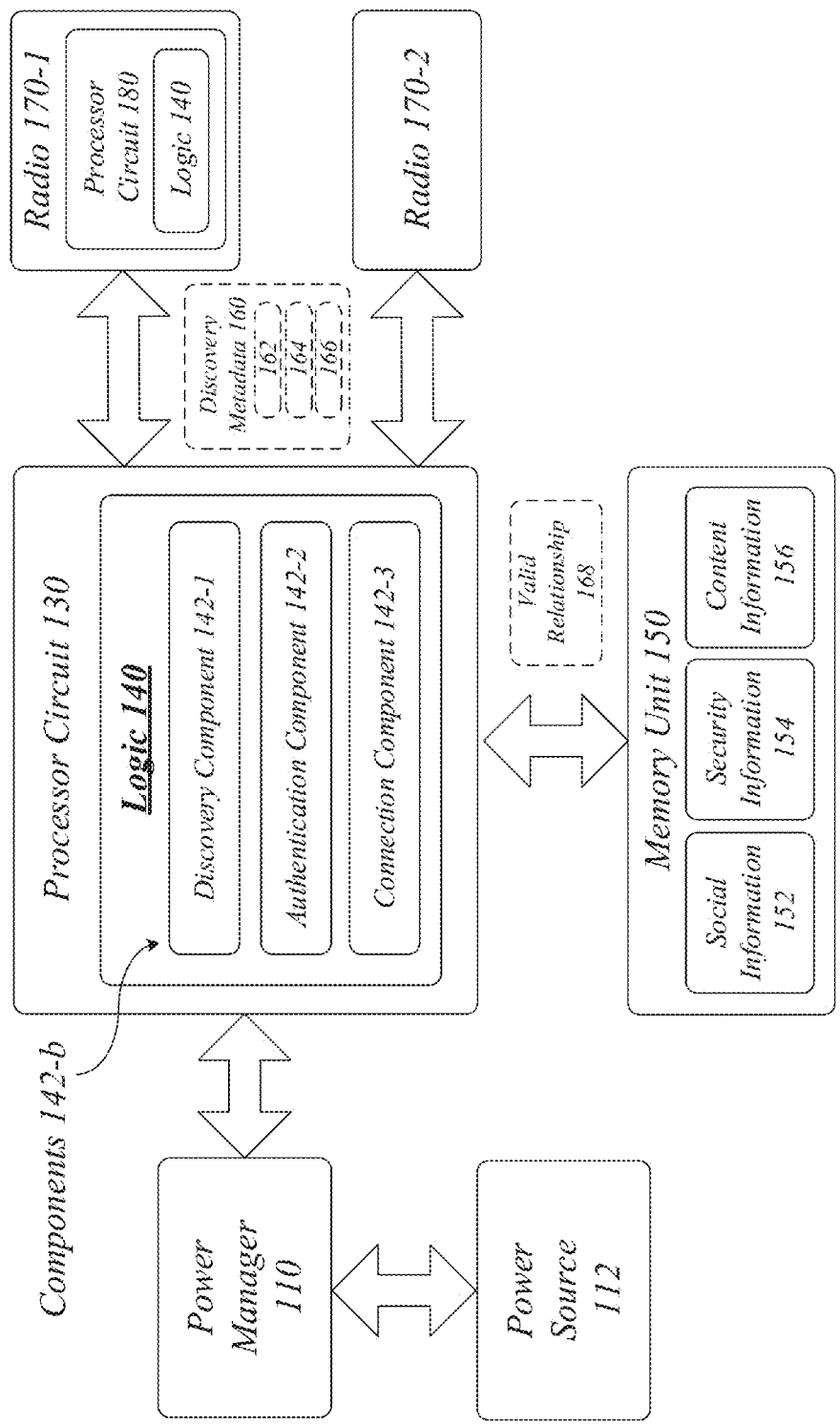
FIG. 1B illustrates an embodiment of a mobile device.

FIG. 1B illustrates a more detailed block diagram for the mobile device 102. As shown in FIG. 1B, the mobile device 102 may comprise a power manager 110, a power source 112, a processor circuit 130, a memory unit 150 and a pair of radios 170-1, 170-2. Although the mobile device 102 shown in FIG. 1B has a limited number of elements in a certain topology, it may be appreciated that the mobile device 102 may include more or less elements in alternate topologies as desired for a given implementation.

The mobile device 102 may comprise a power manager 110. The power manager 110 may be generally arranged to manage one or more power states for one or more parts of the mobile device 102. More particularly, the power manager 110 may manage two or more power states of the processor circuit 130 of the mobile device 102 based on one or more control directives received from the power interface component 142-3 of the logic 140.

In one embodiment, the power manager 110 may manage power in accordance with a power management standard or specification, such as the Advanced Configuration and Power Interface (ACPI) specification, for example. The ACPI specification provides an open standard for device configuration and power management by the operating system. When an electronic device is not being fully utilized by a user, power management techniques such as ACPI may be used to place the electronic device in various power states (or performance states), with each power state reducing or eliminating an amount of power provided by the power source 112 to various components of the electronic device to reduce overall power consumption for the electronic device. The ACPI specification is merely one example of power management suitable for the mobile device 102, and others may be implemented as well. The embodiments are not limited in this context.

The mobile device 102 may comprise a power source 112 coupled to the power manager 110. The power source 112 may be generally arranged to provide power to some or all components of the mobile device 102. In one embodiment, the power source 112 may comprise a portable power source, such as a battery, for example. In one embodiment, the power source 112 may comprise a non-portable power source, such as an AC main power supply. The embodiments are not limited in this context.

The mobile device 102 may comprise a processor circuit 130 coupled to the power manager 110. The processor circuit 130 may be generally arranged to execute logic for the mobile device 102, such as logic 140, for example. Examples for the processor circuit 130 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked. The embodiments are not limited in this context.

The processor circuit 130 may comprise or implement logic 140. The logic 140 may be generally arranged to perform a set of logical operations designed to produce a specific result. In one embodiment, for example, the logic 140 may control operations needed for discovering peer devices, authenticating peer devices, managing communications protocols used for peer-to-peer connections, establishing peer-to-peer connections, terminating peer-to-peer connections, management of security credentials to access a device or network, management of radio operations, and management of power states, among other operations. The logic 140 may be implemented in hardware, software, or a combination of hardware and software. In one embodiment, for example, logic 140 may be implemented as one or more software applications comprising one or more components 142-b, as described in more detail herein.

The mobile device 102 may comprise a memory unit 150 coupled to the processor circuit 130. The memory unit 150 may be generally arranged to store information for the mobile device 102, such as one or more types of social information 152, for example. In various embodiments, the memory unit 150 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). The embodiments are not limited in this context.

The mobile device 102 may comprise radios 170-1, 170-2, each coupled to the processor circuit 130. The radios 170-1, 170-2 may each comprise a radio-frequency (RF) transceiver generally arranged to send and receive electro-magnetic signals with encoded information over one or more antennas.

As with the processor circuit 130, the radios 170-1, 170-2 may comprise various hardware and software components, including a processor circuit 180 (e.g., a baseband processor). In one embodiment, the processor circuit 180 of the radio 170-1 may implement the logic 140 with components 142-b. This may be desirable to free up the processor circuit 130 for other tasks (e.g., such as executing application programs), system-on-a-chip (SoC) implementations, interoperability with other radio operations, and other configurations. The radios 170-1, 170-2 may implement other components as desired for a given implementation.

In various embodiments, the radios 170-1, 170-2 may employ any of a wide variety of signaling technologies enabling computing devices to wirelessly communicate with other devices. Where the use of wireless signal transmission is entailed, these interfaces may employ signaling and/or protocols conforming to any of a variety of industry standards, including without limitation, various communications protocols suitable for use with various types of longer range wireless systems, shorter range wireless systems, and peer-to-peer wireless systems.

Longer range wireless systems may include without limitation cellular radiotelephone systems, wireless local area network (WLAN) systems, wireless metropolitan area network (WMAN) systems, wireless wide area network (WWAN) systems, and so forth. Examples of such wireless systems may include without limitation any of the Institute of Electrical and Electronics Engineers (IEEE) 802.11 ("Wi-Fi"), 802.15 ("ZigBee") and 802.16 ("Wi-MAX") standards, 3rd Generation Partnership Project (3GPP) Long Term Evolution (LTE) and LTE-Advanced (LTE ADV) standards, and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (Wi-MAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, and so forth. The embodiments are not limited in this context.

Shorter range wireless systems may include without limitation wireless personal area network (WPAN) systems, wireless body area networks (WBAN), and so forth. One example of a WPAN system may include without limitation a Bluetooth system operating in accordance with the Bluetooth Special Interest Group (SIG) series of protocols, as well as one or more Bluetooth Profiles, and so forth. Other examples may include systems using infrared techniques such as those defined by the Infrared Data Association (IrDA), near-field communication techniques and protocols such as electro-magnetic induction (EMI) techniques, wireless universal serial bus (USB), z-wave, ZigBee, and so forth. An example of EMI techniques may include passive or active radio-frequency identification (RFID) protocols and devices. The embodiments are not limited in this context.

Peer-to-peer wireless systems may include without limitation Wi-Fi Direct, Wi-Fi ad hoc, Bluetooth, Apple AirDrop, Universal Plug and Play (UPnP), devices profile for web devices (DPWS), zero-configuration networking (Zero-Conf), Ares, Bitcoin, BitTorrent, Direct Connect, FastTrack, eDonkey, Gnutella, Manolito/MP2 PN, OpenNap, 100Bao, Aimster, Applejuice, Filetopia, Freenet, GnucleusLAN, GoBoogy, KuGoo, OpenFT, Mute Network, Soribada, Soulseek, Xunlei, BearShare, Blubster, Gnotella, Gnucleus, Grokster, GTK-gnutella, iMesh, Kazaa, Limewire, Mactella, MXIE, Morpheus, Piolet, RocketltNet, Shareaza, WinMX, Vagaa, and others. Note that some of these examples include protocols used by multiple software programs, protocols used by a single program, or program names using customized versions of peer-to-peer protocols.

Peer-to-peer networks typically implement some form of virtual overlay network on top of a physical network topology, where the nodes in the overlay form a subset of the nodes in the physical network. For instance, a Wi-Fi Direct peer-to-peer network may form a virtual overlay network on top of a Wi-Fi physical network. Data is still exchanged directly over the underlying transmission control protocol (TCP) and internet protocol (IP) (TCP/IP) network, but at the application layer peers are able to communicate with each other directly, via the logical overlay links. Each of the logical overlay links may correspond to a path through the underlying physical network. Overlays are used for indexing and peer discovery, and make the peer-to-peer system independent from the physical network topology. Based on how the nodes are linked to each other within the overlay network, and how resources are indexed and located, peer-to-peer networks can classify networks as unstructured, structured, or a hybrid between the two.

In various embodiments, the radios 170-1, 170-2 may each implement one or more wireless communications protocols suitable for use with longer range wireless systems, shorter range wireless systems, and/or peer-to-peer wireless networks, among other types of networks.

In one embodiment, each of the radios 170-1, 170-2 may implement multiple wireless communications protocols. For example, the radio 170-1 may implement a first protocol in accordance with a Wi-Fi Direct wireless system, and a second protocol in accordance with a Bluetooth wireless system. The radio 170-2 may implement a third communications protocol in accordance with an IrDA protocol, and a fourth communications protocol in accordance with a WBAN protocol. Embodiments are not limited to this example.

In one embodiment, the radios 170-1, 170-2 may implement different wireless communications protocols. For example, the radio 170-1 may implement a first protocol in accordance with a Wi-Fi Direct wireless system, while the radio 170-2 may implement a second protocol in accordance with a Bluetooth wireless system. Embodiments are not limited to this example.

Referring again to the processor circuit 130, the logic 140 arranged for execution on the processor circuit 130 may include a discovery component 142-1. The discovery component 142-1 may be generally arranged to manage discovery phase operations for the mobile device 102 to discover one or more mobile devices 112 (peers) that may be suitable candidates for establishing a peer-to-peer connection. In one embodiment, for example, the discovery component 142-1 may discover a remote device, such as a mobile device 112, utilizing a first protocol, such as the Wi-Fi Direct protocol via the radio 170-1. The discovery component 142-1 may retrieve discovery metadata 160 from the mobile device 112. The discovery metadata 160 may include, among other types of information, social information 162 and protocol information 164.

Figure 9:
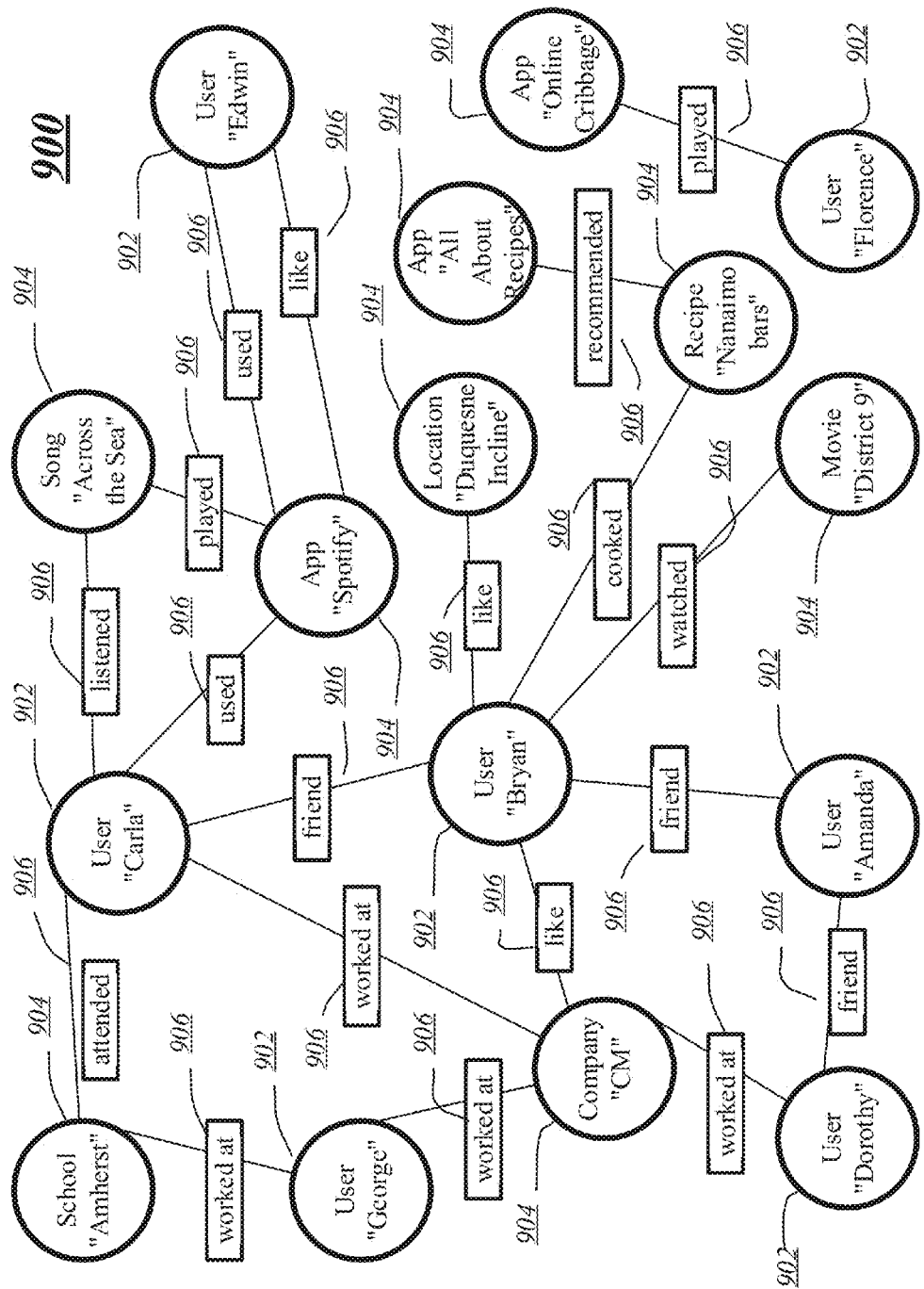
FIG. 9 illustrates an embodiment of a social graph.

Social information 162 may be used, for example, to accelerate discovery phase and session phase operations. Social information 162 may comprise any information associated with a social networking service. In one embodiment, for example, social information 162 may include a social graph for a social networking service, such as social graph 900 described with reference to FIG. 9. As shown in FIG. 9, a pair of nodes in a social graph may be connected to each other by one or more edges. An edge connecting a pair of nodes may represent a relationship between the pair of nodes. In particular embodiments, an edge may include or represent one or more data objects or attributes corresponding to the relationship between a pair of nodes. As an example and not by way of limitation, a first user may indicate that a second user is a "friend" of the first user. In response to this indication, the social networking service may send a "friend request" to the second user. If the second user confirms the "friend request," the social networking service may create an edge connecting the first user's user node to the second user's user node in the social graph, and store the edge as social information 162 in one or more data stores.

A social networking service may have varying types of defined relationships. A defined relationship may be any formal relationship giving a certain level of permission to access content between users. In some cases, for example, the defined relationship may comprise a dyadic relationship. A dyadic relationship may refer to members of a social graph having an ongoing relationship or interaction. An example of a dyadic relationship may be friends in a social networking service. For instance, a first user may have a defined relationship with a second user. This type of relationship may be referred to herein as a "first degree relationship."

In one embodiment, the members of the social graph may include a first user having a defined relationship with a second user, who in turn has a defined relationship with a third user. The third user may not have a defined relationship with the first user. In this case, the first and third friends have a second degree relationship with each other through the second friend. This type of relationship may be referred to herein as a "second degree relationship."

It may be appreciated that a dyadic relationship may include more than three friends as desired for a given implementation, leading to many degrees of relationship. In addition, relationships may be defined on a group level, with varying degrees of separation. The embodiments are not limited in this context.

Protocol information 164 may be used, for example, to accelerate session phase operations. Protocol information 164 may comprise any information related to, or associated with, a communications protocol used by the radios 170-1, 170-2 of a mobile device 102 and/or mobile device 112. For instance, the protocol information 164 may include a protocol name, protocol identifier, radio identifier, a network identifier, a system identifier, capabilities information, RF bands, wireless access point (WAP) identifiers, configuration information, profile information, modulation-and-coding scheme, coders/decoders ("codecs"), protocol stack information, bandwidth information, channel measurements such as signal-to-noise ratio (SNR) levels, hand-off information, and so forth. The embodiments are not limited in this context.

The logic 140 may comprise an authentication component 142-2. The authentication component 142-2 may be generally arranged to manage authentication operations during discovery phase operations. In one embodiment, for example, the authentication component 142-2 may authenticate a valid relationship 168 with a user of the mobile device 112 based on the social information 162 included with the discovery metadata 160.

A valid relationship 168 may comprise any defined relationship identified by the social information 162 that provides a needed level of authentication for a given implementation. One embodiment may implement a higher level of authentication, for example, and therefore would identify a defined relationship such as a first degree relationship as needed to comprise a valid relationship 168. Another embodiment may implement a lower level of authentication, for example, and therefore would identify defined relationships such as either a first degree relationship or a second degree relationship as needed to comprise a valid relationship 168. Many other levels may be implemented, and embodiments are not limited in this context.

The authentication component 142-2 may be arranged to traverse the social graph 900, and evaluate nodes and edges to identify particular relationships between the nodes. Each of the nodes may represent a user of the mobile device 102 and/or the mobile device 112. The authentication component 142-2 may have defined criteria indicating a number of edges between nodes that constitute a valid relationship. The authentication component 142-2 may traverse the social graph 900, identify nodes corresponding to a user of the mobile device 102 and a user of the mobile device 112, and count a number of edges between the nodes. The authentication component 142-2 may compare the number of edges in the defined criteria with the actual number of edges between nodes, and identify a formal or informal relationship between nodes, and determine a valid relationship 168 when the number of edges match (or is greater than or lesser than a given number of edges). There may be varying types of valid relationships 168, each with corresponding levels of security and access privileges, defined for a given implementation. Examples of valid relationship types may include without limitation relationships such as friends, close friends, family, degrees of friendship (e.g., friends-of-friends), public, professional, business, organizations, memberships, enterprises, and any other formal or informal relationship between two or more users. The embodiments are not limited in this context.

Additionally or alternatively, the authentication component 142-2 may also utilize pre-loaded security credentials associated with a given user of the mobile device 102 and/or mobile device 112, as well as a social networking service, in order to authenticate a device and/or user for a peer-to-peer connection. For instance, the mobile device 102 and/or the mobile device 112 may store various types of security information 154 necessary to access one or more social networking services. Each social networking service provider may have different requirements to access services provided by the social networking service, such as different security mechanisms, cost structures, agreements, feature sets, access requirements, authentication requirements, and so forth. The security information 154 may represent or comprise all necessary information to access a particular social networking service. Such information may include without limitation information such as social networking service provider information, user information, user account information, device information, network information, and other similar types of information needed to access and utilize the social networking service. Examples of security information 154 may include social network tokens, security tokens, security certificates, third-party security certificates, cryptographic keys, passwords, passcodes, personal identification numbers, login credentials, and so forth. Embodiments are not limited in this context.

The security information 154 may be stored in the mobile devices 102, 112 based on defined relationships between users of the mobile devices 102, 112 upon prior approval of the users. For instance, when a user utilizes the mobile device 102 or mobile device 112 to connect to a social networking service, a graphical user interface (GUI) message may surface requesting whether the user would like to download security information 154 allowing authentication between friends in the social graph 900. Upon user approval, the social networking service may download a security token that matches a security token associated with each friend in the social graph 900. The security tokens may then be used to authenticate mobile devices 102, 112 owned by friends in the social graph 900 for peer-to-peer communications.

The authentication component 142-2 may compare the security information 154 stored in the mobile device 102 with security information 154 stored in the mobile device 112 and received by the mobile device 102. When there is a match, the mobile device 112 may be authenticated, and subsequently authorized for peer-to-peer connections.

The logic 140 may comprise a connection component 142-3. The connection component 142-3 may be generally arranged to manage peer-to-peer connections between the mobile devices 102, 112 during a session phase. Once a user of a mobile device 112 has been authenticated, the connection component 142-3 may automatically establish a peer-to-peer connection with the mobile device 112 with a second protocol, such as the Bluetooth protocol via the radio 170-2. Furthermore, the connection component 142-3 may accelerate establishment of the peer-to-peer connection relative to conventional techniques based on the protocol information 164 exchanged between the mobile devices 102, 112.

In one embodiment, the single radio 170-1 may be used both during the discovery phase and the session phase, using different wireless communications protocols for each phase. For instance, the radio 170-1 of the mobile device 102 may be used to communicate with the mobile device 112 utilizing the Wi-Fi Direct protocol during the discovery phase. The radio 170-1 of the mobile device 102 may also be used to communicate with the same mobile device 112 utilizing the Bluetooth protocol during the session phase. This embodiment assumes the mobile device 112 is capable of utilizing both protocols, either with one or both radios 170-1, 170-2 implemented by the mobile device 112.

In one embodiment, each of the radios 170-1, 170-2 may be used during the discovery phase and the session phase, respectively. For instance, the radio 170-1 of the mobile device 102 may be used to communicate with the mobile device 112 utilizing the Wi-Fi Direct protocol during the discovery phase. The radio 170-2 of the mobile device 102 may be used to communicate with the same mobile device 112 utilizing the Bluetooth protocol during the session phase. This embodiment assumes the mobile device 112 is capable of utilizing both protocols, either with one or both radios 170-1, 170-2 implemented by the mobile device 112.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 2 illustrates one embodiment of a logic flow 200. The logic flow 200 may be representative of some or all of the operations executed by one or more embodiments described herein, such as the operations performed by the mobile device 102 and/or mobile device 112 during a discovery phase, a session phase and a terminating phase of a peer-to-peer network.

In the illustrated embodiment shown in FIG. 2, the logic flow 200 may send an inquiry message from a first device with a first protocol during a discovery phase, the inquiry message to discover a second device within communications range of the first device. In some embodiments, the inquiry message to include social information to identify a user of the first device as part of a social graph of a social network at block 202. For example, the discovery component 142-1 may send an inquiry message from a mobile device 102 with a Wi-Fi Direct protocol during a discovery phase. The inquiry message may be used to discover a mobile device 112 within communications range of the mobile device 102. In some embodiments, the inquiry message may include social information 152 to identify a first user of the mobile device 102 as part of a social graph 900 of a social network.

The logic flow 200 may receive an inquiry response message from the second device with the first protocol during the discovery phase. In some embodiments, the inquiry response message includes information to identify a user of the second device as part of the social graph of the social network, and a list of second protocols for use by the second device at block 204. For example, the discovery component 142-1 of the mobile device 112 may receive the inquiry message from the mobile device 102, retrieve the social information 152 from the inquiry message, and compare the social information 152 with social information 162 stored by the mobile device 112. The mobile device 112 may then determine whether there is a defined relationship between the users of the mobile devices 102, 112 based on the comparison in order to determine whether to respond to the inquiry message. When there is a defined relationship, the discovery component 142-1 of the mobile device 112 may generate and send an inquiry response message to the mobile device 102 in response to the inquiry message received from the mobile device 102.

The discovery component 142-1 of the mobile device 102 may receive the inquiry response message from the mobile device 112 with the first protocol during the discovery phase. The inquiry response message may include, for example, social information 162 to identify the user of the mobile device 112 as part of the social graph 900 of the social network, and a list of second protocols for use by the second device.

As part of the discovery phase, in an attempt to gather as much information as possible to assist in set up of a peer-to-peer connection between the mobile devices 102, 112, during the session phase, the inquiry response message may also include connection information 166 for one or more of the second protocols. For example, once the discovery component 142-1 receives the inquiry response message from the mobile device 112, the discovery component 142-1 may send a discovery request message from the mobile device 102 to the mobile device 112 with the first protocol during the discovery phase. The discovery request message may include a request for connection information 166 for one of the second protocols. The discovery component 142-1 of the mobile device 112 may generate a discovery response message to the discovery request message with the connection information 166, and send the discovery response message to the mobile device 102.

The discovery component 142-1 of the mobile device 102 may receive the discovery response message from the mobile device 112 with the first protocol during the discovery phase, with the discovery response message to include connection information 166 for one of the second protocols.

As an alternative to using the discovery request/response messages, the discovery component 142-2 of the mobile device 102 may include a request for connection information 166 in the inquiry message, and receive the connection information 166 from the discovery component 142-2 of the mobile device 112 in the inquiry response message. This arrangement may potentially reduce message traffic at a cost of increased message size.

The logic flow 200 may authenticate a valid relationship between the first and second users based on the first and second social graphs at block 206. For example, the authentication component 142-2 of the mobile device 102 may authenticate a valid relationship 168 between the first and second users based on the social information 152, 162. The authentication component 142-2 may automatically or programmatically authenticate a valid relationship 168 based on a set of rules. Additionally or alternatively, a user interface element may be surfaced in a user interface view to request manual authentication by a user of the mobile device 102.

The particular embodiments may have varying types of valid relationships 168. In one embodiment, for example, a first type of valid relationship 168 may comprise a first degree relationship between the users of the mobile devices 102, 112. In this case, a first degree relationship implies a higher level of trust and therefore potentially a lower level of security may be needed between the mobile devices 102, 112. In one embodiment, for example, a second type of valid relationship 168 may comprise a second degree relationship between the users of the mobile devices 102, 112. In this case, a second degree relationship implies a lower level of trust and therefore a higher level of security may be needed between the mobile devices 102, 112. Security settings, and discovery and session phase operations, may be adjusted accordingly based on a given type of valid relationship 168. Although only two types of valid relationship 168 are described, it may be appreciated that any number of types of valid relationships 168 may be defined to give a desired level of granularity to operations of the logic 140.

As an alternative to automatic authentication, a user may manually authenticate a user of the mobile device 112. A user interface element, such as a dialog, may be presented in a user interface view to inform a user of the mobile device 102 that a mobile device 112 has been detected, and request whether the user of the mobile device 102 would like to manually authenticate the user of the mobile device 112 for a peer-to-peer connection. When a user responds affirmatively (e.g., via touch screen, voice command, pointing device, or other input device), the user interface view may generate a control directive and send to the authentication component 142-2. The authentication component 142-2 may automatically or programmatically authenticate a valid relationship 168 based on the received control directive.

The logic flow 200 may automatically establish a peer-to-peer connection between the first and second devices with one of the second protocols during a session phase when a valid relationship is authenticated at block 208. For example, once the user of the mobile device 112 is authenticated, the connection component 142-3 of the mobile device 102 may automatically establish a peer-to-peer connection between the mobile devices 102, 112 with the selected second protocol during a session phase. The connection component 142-3 of the mobile device 102 may select a second protocol from the list of second protocols received from the second device based on one or more selection criteria. The selection criteria may reflect speed of connection, simplicity of set up, bandwidth considerations, security considerations, user preferences, network preferences, and any other desired criteria.

As an alternative to automatic connection, a user may manually control establishment of a connection to the mobile device 112. A user interface element, such as a dialog, may be presented in a user interface view to inform a user of the mobile device 102 that a mobile device 112 has been authenticated, and request whether the user of the mobile device 102 would like to establish a peer-to-peer connection with the mobile device 112. When a user responds affirmatively (e.g., via touch screen, voice command, pointing device, or other input device), the user interface view may generate a control directive and send to the connection component 142-3. The connection component 142-3 may automatically or programmatically establish a peer-to-peer connection based on the received control directive. Optionally, the connection component 142-3 may notify the mobile device 112 that the user of the mobile device 120 has requested/approved a peer-to-peer connection, and cause presentation of a user interface view on the mobile device 120 to seek approval from the user of the mobile device 120, prior to establishing the peer-to-peer connection. In this case, the connection component 142-3 may then automatically or programmatically establish the peer-to-peer connection based on the control directives received from both users. In all cases, a particular set of protocols used during the discovery phase and/or session phase may be selected automatically by the logic 140, semi-automatically with limited user input, or manually via user directed commands. Embodiments are not limited in this context.

As used herein, the term "automatically" and its derivations may refer to establishing a peer-to-peer connection without any manual intervention from a user. For instance, the Bluetooth protocol typically requires several instances of user instructions before establishing a peer-to-peer connection with a device, not the least of which is to manually initiate discovery operations, manually select candidate devices responding to discovery requests, and manually enter pairing information such as personal information number (PIN) or authorization code. By way of contrast, the connection component 142-3 may use discovery metadata 160, such as social information 162 and protocol information 164, as retrieved by the discovery component 142-1 and authenticated by the authentication component 142-2, to establish a peer-to-peer connection between the mobile devices 102, 112 without any user intervention by one or both users of the mobile devices 102, 112.

Once the mobile device 102 establishes a peer-to-peer connection with the mobile device 112, the mobile device 102 may send content information to the mobile device 112 over the peer-to-peer connection during the session phase. Similarly, the mobile device 102 may receive content information from the mobile device 112 over the peer-to-peer connection during the session phase. The content may comprise any type of content, including media content, application programs, application program updates, application files, audio files, video files, multimedia files, pictures, images, text, sounds, symbols, digital information, analog information, and so forth. The embodiments are not limited in this context.

The connection component 142-3 may terminate a peer-to-peer connection when a terminating condition is met. A terminating condition may comprise expiration of a timer, loss of connectivity, bandwidth constraints, power constraints, processor constraints, device resource utilization, security breach, user control directives, and other suitable terminating conditions. The embodiments are not limited in this context.

Although the logic flow 200 provides an example of discovery phase and session phase operations from the perspective of the mobile device 102 when acting as an initiator of a peer-to-peer connection, it may be appreciated that the same or similar operations may be performed by the mobile device 112 when it acts as an initiator. Similarly, the mobile device 102 may perform operations similar to the mobile device 112 when acting as a responder for a peer-to-peer connection. Furthermore, although only two mobile devices 102, 112 are described in the logic flow 200, it may be appreciated that similar operations may be performed in serial or parallel when there are more than two mobile devices (e.g., mobile device 102, mobile device 112-1, and mobile device 112-2).

Figure 3A:
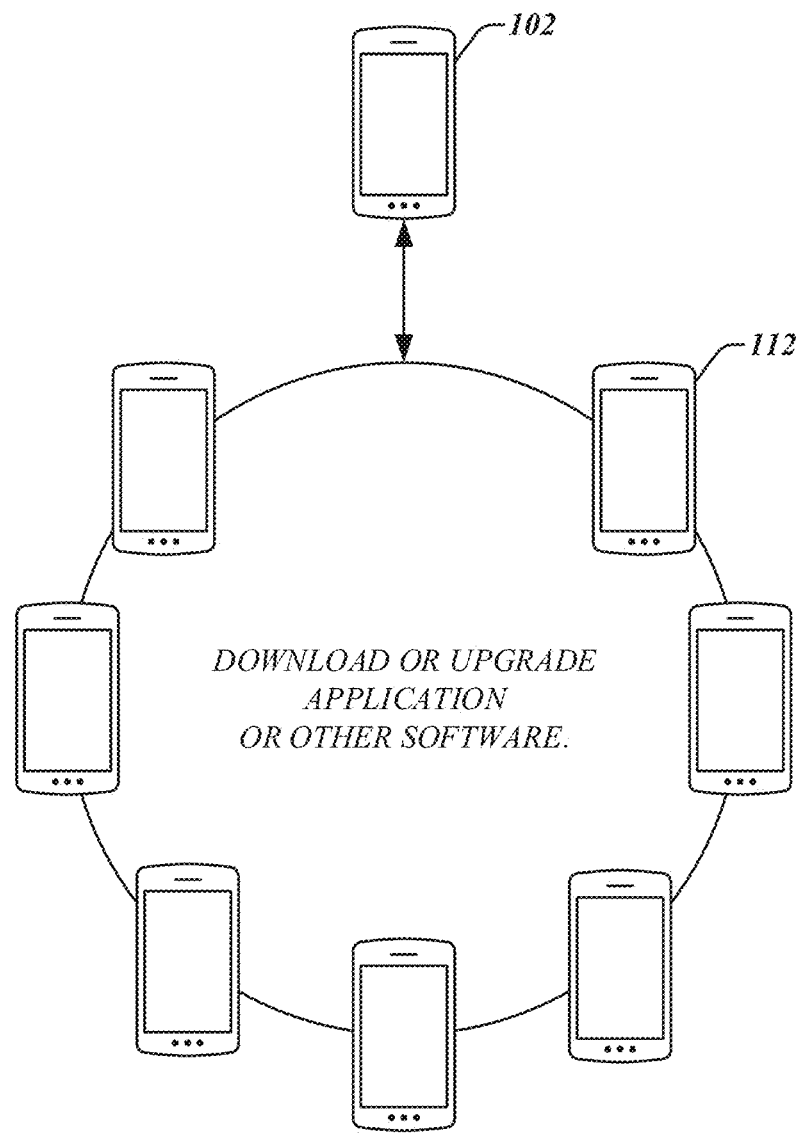
FIG. 3A illustrates an embodiment of a first peer-to-peer network.

FIG. 3A illustrates a peer-to-peer network 300 according to an embodiment. In some embodiments, peer-to-peer network 300 may be established using a discovery phase of a first standard, such as Wi-Fi Direct, and a session phase of a second standard, such as Wi-Fi ad hoc or Bluetooth, for example. As illustrated, mobile device 102 may transfer an application or upgrade of an application to one or more mobile devices 112 using the peer-to-peer network.

In many parts of the world, there may be limited options for the connectivity of mobile devices. Many people may live in rural or otherwise undeveloped areas with no access to broadband internet through Ethernet or Wi-Fi. Further, if any cellular connection is available, it may be limited to relatively slow speeds available on 2G (GPRS) or 2.5G (EDGE) networks. At GPRS and EDGE speeds, it may take 30-120 minutes to upgrade a mobile application (assuming, for example, a 13 MB download and no ability to perform delta updates). Further, even if the download is possible, downloading 13 MB of data may have material financial cost to the user. Despite these limitations, many users may possess the hardware necessary to connect with each other and share information, such as mobile applications and updates to the same, via local protocols like Bluetooth and Wi-Fi. Using a local peer-to-peer connection established using the techniques described herein, users in these areas may have access to applications and application updates without the lengthy download process or costly download fees, as long as one or more users previously downloaded the content to a mobile device.

In some embodiment, users may discover each other and identify each other as users of a social networking system using a social graph, such as that described herein with respect to FIG. 9. In one embodiment, the discovery phase may indicate which applications provided by the social networking system are available from one user to another, including version information. Whomever has the most recent version of a particular application may be designated as the host of the application and may use a peer-to-peer connection to transfer it to the other users.

In an embodiment, the users may indicate an intent (to share and/or to download/update) via a user interface (such as a system notification box or other setting interface) provided within a software application. After an intent has been indicated, software on each mobile device may complete the transaction via the established peer-to-peer connection. If users have indicated that they would like to share applications based on prior social graph information, the user experience may change. For example, instead of a system notification box asking one user to download from another, a sharing user may have previously indicated that they would like to automatically share applications with friends and therefore would not be required to provide user input. In this case, the sharing user may simply receive a notification that such an event occurred. Similarly, a user wishing to download an application or update to an application may set their system through a user interface to automatically download from friends and may receive a system notification that the download occurred rather than indicating their user intent. The ability to transfer application information without immediate and manual user intervention may be a scalable benefit of establishing connectivity using a social networking system. For example, it allows one to limit the physical connectivity graph to ensuring resources are only consumed by people the user knows or authorizes.

In an embodiment, the synchronization of applications between users may have no intents and may be completely transparent to the user. Further, in an embodiment, in instances where a user encounters multiple users with the same application, to minimize the burden to any particular user, the mobile device wishing to upgrade may take complementary fragments for all devices in proximity and re-assemble the application for use.

In an embodiment, metadata transferred during a discovery phase or a session phase may be used to establish delta information (e.g., information indicating which portions of an application need to be updated to achieve the latest version). In this manner, only differences in application data are transferred, saving time and resources such as battery life for the power source 112. It may also allow a mobile device 102 or mobile device 112 to remain in a lower power mode via the power manager 110, thereby conserving even more battery life. In an example, a protocol such as rsync may be used to perform such a data transfer.

In an embodiment, to ensure applications do not get modified with viruses or other malfeasances, a public digital signature or certificate from the original application store or origination on a new device may be verified in the session along with a developer certificate. For example, if a user downloads the application from the an application store (Apple App Store™ or Google Play Store™), a user wishing to upgrade the application may verify the application data obtained via a peer-to-peer connection was digitally signed by the social networking system with their private key and certificate, downloaded from the internet. Similarly, an OEM who originates the device with the application may store the original digital signature and public key for the application, and store the full chain of changes to the application through upgrades that can be verified by another user. Similarly, all security measures needed to maintain the applications, including digital signatures, public keys and key management, may be maintained by the social networking system.

Figure 3B:
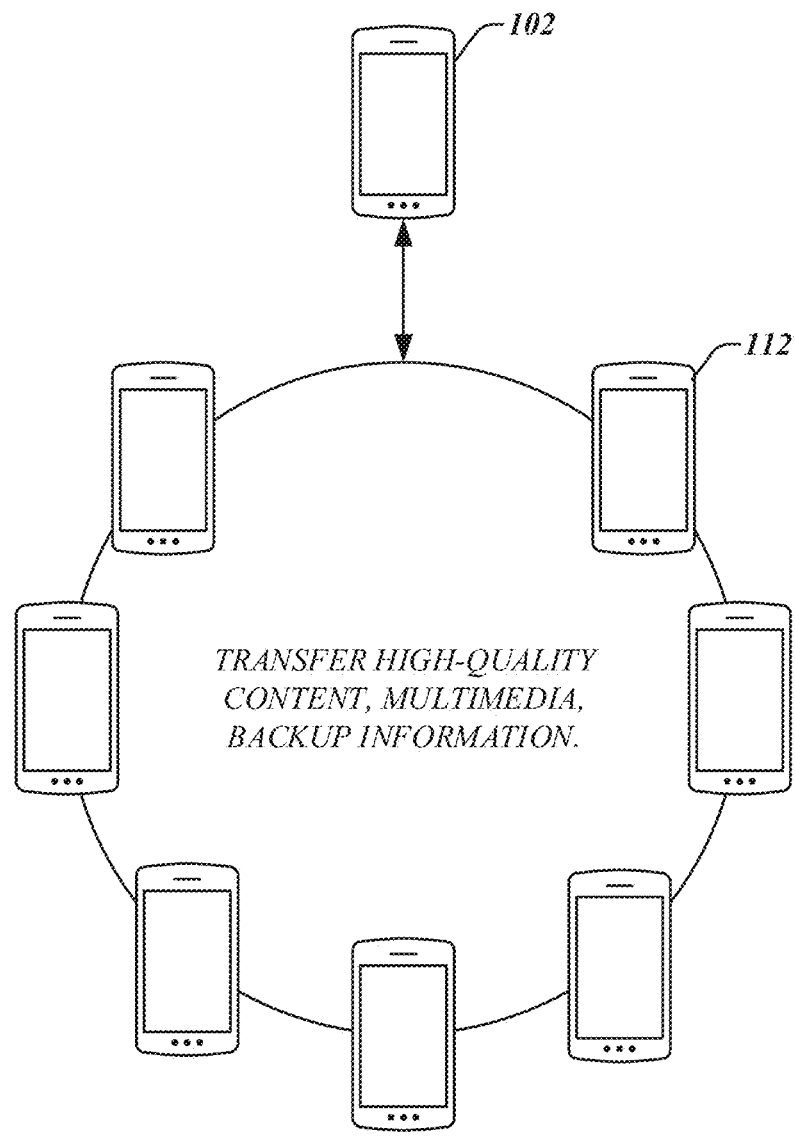
FIG. 3B illustrates an embodiment of a second peer-to-peer network.

FIG. 3B illustrates a peer-to-peer network 320 according to an embodiment. In some embodiments, peer-to-peer network 320 may be established using a discovery phase of a first standard, such as Wi-Fi Direct, and a session phase of a second standard, such as Wi-Fi ad hoc or Bluetooth, for example. As illustrated, a mobile device 102 may transfer high-quality information, multimedia, or backup information to one or more mobile devices 112 using the peer-to-peer network 320.

In an embodiment, users of a peer-to-peer network may exchange content information 156, such as contact information or multimedia information (e.g., music, videos, e-books, etc.), using a peer-to-peer connection established using the techniques discussed herein. Like application transfer discussed above, the transfer of contact or multimedia information may be intentionally selected by users or preset to occur automatically using settings saved within a social network. For example, a user may choose to automatically update music based upon a playlist maintained by a friend in her social graph. Due to the resource intensive nature of multimedia (large file sizes, for example), limits may be preset by the user or an application regarding these transfers. In some embodiments, users may be able to limit automatic transfers based upon remaining battery life of a device, a set battery usage for a specific time period (per day, per week), a remaining amount of storage on a device (number of MB or a percentage of space), or an amount of data transferred in a particular time period, for example. This can be configured via a set of rules implemented by the power manager 110 of the mobile device 102 or mobile device 112.

Likewise, in some embodiments, resource intensive content information 156 for a social networking application, such as high-resolution photos, cover photos, profile photos, news feed status updates, cached websites, videos, or music, that may be shared or otherwise made available to a user, may be transferred from other users using a peer-to-peer connection established using the techniques described herein. A user who has access to Wi-Fi may have a social networking application installed on a mobile device, such as mobile device 102. During this period, the social networking application may download additional data, such that described above for the user and also others in his social graph. For example, content may be downloaded for users for which a recent peer-to-peer connection has been made (within the past day, week, month, etc.). During the next peer-to-peer connection, this data may be transferred to respective members of the social network and subsequently deleted from the user's mobile device, so as to save storage space.

In another embodiment, a user may use peer-to-peer networking techniques described herein to transfer backup data, such as contacts, bookmarks, applications, photos, and videos, for example, to a new mobile device from an old mobile device. In this manner, the manual process of transferring data using a computer, media card, or broadband/cellular network connection may be avoided.

Figure 3C:
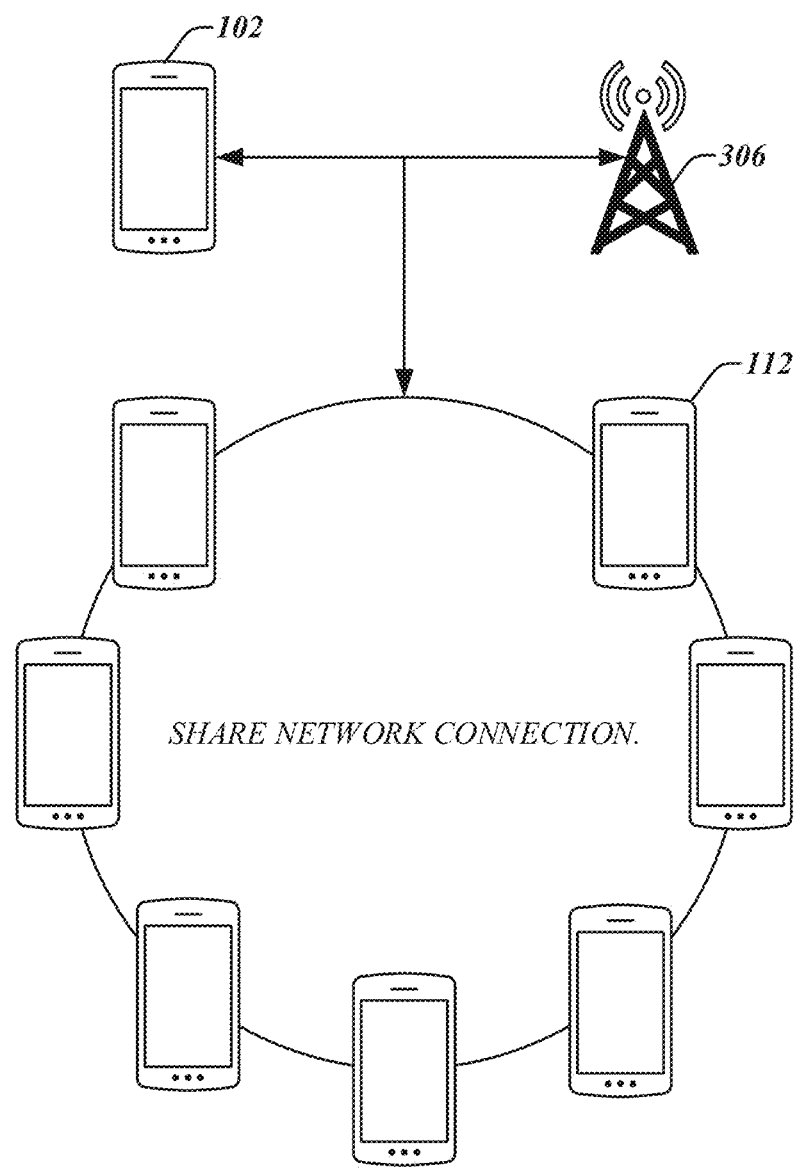
FIG. 3C illustrates an embodiment of a third peer-to-peer network.

FIG. 3C illustrates a peer-to-peer network 340 according to an embodiment. In some embodiments, peer-to-peer network 340 may be established using a discovery phase of a first standard, such as Wi-Fi Direct, and a session phase of a second standard, such as Wi-Fi ad hoc, for example. As illustrated, mobile device 102 may share a cellular connection 306 with one or more mobile devices 112 using the peer-to-peer network.

In an embodiment, multiple users in the same location may experience a poor cellular connection (GPRS, EDGE). Using the peer-to-peer connection techniques described herein, a peer-to-peer network may be established such that a distributed caching protocol may be used. In this manner, while each user experiences a poor connection, common content may be transmitted using the combined bandwidth of all users within the peer-to-peer network. For example, when using a social network application or website, many users within the same social graph may need to download or upload similar content. Further, users may desire to download common applications, games, videos, or music. To the extent that content is overlapping, a distributed caching scheme over a peer-to-peer connection may be beneficial, as common data may be shared among users rather than downloaded multiple times over limited and potentially expensive connections. In such a system, known bit torrent protocols may be used with established peer-to-peer connections and cellular connections to efficiently download overlapping content.

Figure 4:
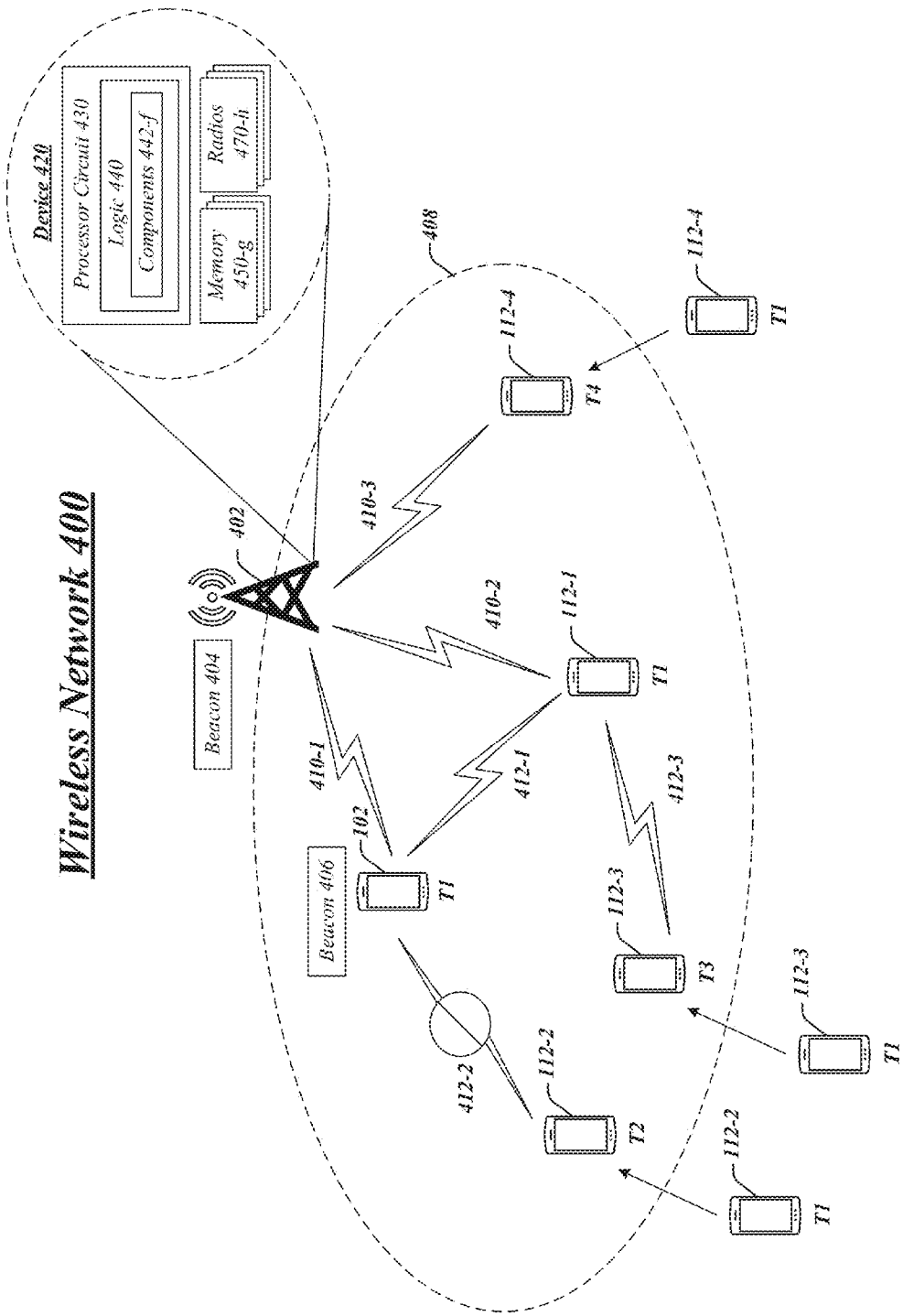
FIG. 4 illustrates an embodiment of a wireless network.

FIG. 4 illustrates a diagram of a wireless network 300. The wireless network 400 illustrates several use case scenarios when using social information 152, 162 in conjunction with multiple communications protocols to accelerate establishment of wireless network connections between multiple mobile devices 102, 112 within the wireless network 400, as well as between a mobile device 102, 112 and the wireless network 400. The wireless network 400 can be of any type, including WBAN, WPAN, WLAN, WMAN, WWAN, cellular network, peer-to-peer network, and so forth.

As shown in FIG. 4, a mobile device 102 and a number of mobile devices 112-1 to 112-4 may communicate with each other, and in some cases, a wireless access point (WAP) 402, at different points in time (e.g., T1 . . . T4). The WAP 402 may be part of the wireless network 400, and provide access to other networks, such as a public network (e.g., the Internet), a private network (e.g., an intranet), or other network. The WAP 402 may assist in setting up a peer-to-peer connection for some communications protocols, such as variants of the Wi-Fi Direct protocol (e.g., Wi-Fi Protected Setup), for example. Although FIG. 4 illustrates a WAP 402 for a WLAN (e.g., a IEEE 802.11 Wi-Fi network), it may be appreciated that other types of access points for other networks may be implemented as well, such as a base station or eNodeB for a cellular network, for example. Embodiments are not limited in this context.

The WAP 402 may include, or be coupled to a device that includes, local or remote computing and communications capabilities, such as a device 420 comprising a processor circuit 430, logic 440, components 442-f, memory units 450-g, and radios 470-h. In one embodiment, the elements of device 420 may be the same or similar to the mobile device 102. In one embodiment the elements of device 420 may be implemented as part of a network infrastructure, such as a cellular radiotelephone network infrastructure or mobile broadband network infrastructure, for example. The computing and communications capabilities provided by the device 420 and/or the WAP 402 allows implementation of the use case scenarios described with reference to FIGS. 3A-3C, as well as others described with reference to FIG. 4.

In addition to assisting in setting up peer-to-peer connections, the WAP 402 may also be arranged to communicate to a customized beacon 404. A customized beacon 404 may be encoded with social information. In various embodiments, the customized beacon 404 may have a data structure that is the same or similar to any beacon used for any wireless communications protocol, as modified to include social information, such as social information 152, 162 or social graph 900. In one embodiment, for example, a customized beacon 404 may be encoded with social information such as an oblique identifier (ID), as described further in co-pending application U.S. Ser. No. 13/843,155, which is hereby incorporated by reference.

The customized beacon 404 may be used for discovery phase operations for a mobile device 102 or mobile device 112 to establish wireless network connections with the wireless network 400. The wireless network connections can be of any type, including WBAN, WPAN, WLAN, WMAN, WWAN, cellular connections, and so forth. Embodiments are not limited in this context. As with peer-to-peer connections, the techniques as described herein may be used to facilitate discovery phase and session phase operations to establish a wireless network connection between a mobile device 102, 112 and the wireless network 400.

In one embodiment, the customized beacon 404 may include social information 152, 162 and advertising information. In this manner, custom advertisements may be targeted to specific members of a social graph 900 of a social networking service. The customized beacon 404 may include various levels of privacy settings so that only mobile devices 102, 112 may recognize the customized beacon 404, and other mobile devices cannot.

In one embodiment, a communications range 408 for the customized beacon 404 may be a configurable setting to ensure that it covers a limited physical area, such as 10 meters to 2 miles, for example. The communications range 408 may be adjusted, for example, by adjusting power provided to the WAP 402, utilizing different modulation and coding schemes, utilizing different types of WAPs, and other communications techniques. By tailoring a communications range 408 for the customized beacon 404, advantages for establishing wireless network connections and sharing content between devices based on social information 152, 162 may be restricted to a target geographic location, such as a classroom, corporate campus, college campus, an office building, and other defined geographic locations.

The customized beacon 404 may be used for other purposes as well. For instance, content such as applications, updates to applications, multimedia information, or other types of content may be downloaded from network servers, or uploaded from a mobile device 102, and temporarily stored as a cache in the device 420. Thus, when the mobile device 102 leaves communications range of the WAP 402, the customized beacon 404 may be used to make a mobile device 112 aware of cached content, which can be delivered once the mobile device 112 establishes a wireless network connection with the WAP 402. In another example, the customized beacon 404 may be used to establish relationships with other users via their mobile devices, facial recognition for photo tagging, group chats for local devices, asynchronous friending, targeted advertisements, targeted social network services, targeted content delivery, enhanced search results based on social information, offline content sharing, and so forth. The embodiments are not limited in this context.

In addition to controlling the communications range 408 for the customized beacon 404, the WAP 402 may also control a timing of the customized beacon 404 in order to conserve battery life and resources for the mobile devices 102, 112.

Returning again to the context of peer-to-peer networks, a mobile device 102 may also use a customized beacon 406. The customized beacon 406 may be the same or similar to the customized beacon 404 used by the WAP 402. An example for the customized beacon 406 may comprise an inquiry message as described with reference to FIG. 2.

In a first use case scenario, assume a mobile device 102 is within communications range 408 at time T1. Further assume that the reason the mobile device 102 is within the communications range 408 is because a computer store in a shopping mall issued an advertisement for a limited release application program to members of a computer club A via a beacon 404 from the WAP 402. The mobile device 102 may utilize the techniques described herein to quickly and automatically establish a wireless network connection 410-1 to the wireless network 400 to download the limited release application program.

In a second use case scenario, also at time T1, assume a mobile device 112-1 is within communications range 408 of the WAP 402. Assume a user of the mobile device 112-1 is not a member of the computer club A, and therefore does not recognize the customized beacon 404 from the WAP 402. However, the user of the mobile device 102 is a friend of the user of the wireless device 112-1 in a different social network, namely computer club B. Assuming digital rights management (DRM) associated with the limited release application program allow, the mobile devices 102, 112-1 may quickly and automatically establish a peer-to-peer connection 412-1 based on the social information, and the mobile device 102 may transfer the application program to the mobile device 112-1 over the peer-to-peer connection 412-1.

In a third use case scenario, as a variation of the second use case scenario, assume a user of the mobile device 112-1 is not a member of the computer club A, and therefore does not recognize the customized beacon 404 from the WAP 402. However, the user of the mobile device 112-1 is a subscriber to a service provider for the wireless network 400. If the user of the mobile device 102 is also a subscriber to the same service provider, the mobile devices 102, 112-1 may both establish wireless network connections 410-1, 410-2, respectively, and use the wireless network connections 410-1, 410-2 for intra-network communications and applications. Effectively, the mobile devices 102, 112-1 may use the wireless network connections 410-1, 410-2 for zero-rated communications and applications.

In a fourth use case scenario, at time T2, assume a mobile device 112-2 enters communications range 408 of the WAP 402. Assume a user of the mobile device 112-2 is not a member of the computer club A, and therefore does not recognize the customized beacon 404 from the WAP 402. Furthermore, whenever the mobile device 102 broadcasts an inquiry message via a beacon 406, it discovers that the user of the mobile device 102 is not a friend of the user of the wireless device 112-2. In this case, there is no peer-to-peer connection 412-2 established between the mobile devices 102, 112-2.

In a fifth use case scenario, at time T3, assume a mobile device 112-3 enters communications range 408 of the WAP 402. Assume a user of the mobile device 112-3 is not a member of the computer club A, and therefore does not recognize the customized beacon 404 from the WAP 402. Furthermore, whenever the mobile device 102 broadcasts an inquiry message via a beacon 406, it discovers that the user of the mobile device 102 is not a friend of the user of the wireless device 112-3. In this case, there is no peer-to-peer connection established between the mobile devices 102, 112-3. However, during the discovery phase, it is discovered that the user of the mobile device 112-1 is a friend of the user of the wireless device 112-3 in a different social network, namely computer club C. Assuming digital rights management (DRM) associated with the limited release application program allow, the mobile devices 112-1, 112-3 may quickly and automatically establish a peer-to-peer connection 412-3 based on the social information, and the mobile device 112-1 may transfer the application program to the mobile device 112-3 over the peer-to-peer connection 412-3.

In a sixth use case scenario, at time T4, assume a mobile device 112-4 enters communications range 408 of the WAP 402. Assume a user of the mobile device 112-4 is a member of the computer club A, and therefore does recognize the customized beacon 404 from the WAP 402. The mobile device 112-4 may utilize the techniques described herein to quickly and automatically establish a wireless network connection 410-3 to the wireless network 400 to download the limited release application program. In addition, assume the user of the mobile device 102 customized the application program, stored the settings in a configuration profile, and uploaded the configuration profile to the WAP 402 (or device 420) with social information 152. During the discovery phase, the WAP 402 (or device 420) may retrieve social information 162 from the mobile device 112-4, compare the social information 152, 162, and identify a valid relationship 168 between the user of the mobile device 102 and the user of the mobile device 112-4. In this case, the mobile device 112-4 may also download the configuration profile for the application program as generated by the user of the mobile device 102 and stored by the WAP 402 (or device 420). This may occur whether the mobile device 102 is within communications range 408 of the WAP 402, or within communications range of the mobile device 112-4.

It may be appreciated that these are merely a few examples of use case scenarios implementing the techniques described herein, and others exist as well. For instance, assume the user of the mobile device 102 purchases a new mobile device 102. The user of the old mobile device 102 and the new mobile device 102 may utilize an automatically established peer-to-peer connection between both devices to provision and transfer content 156 from the old mobile device 102 to the new mobile device 102. This conserves server resources, communications resources for the wireless network 400, and enhance user convenience and experience. Embodiments are not limited to these exemplary use case scenarios.

Figure 5:
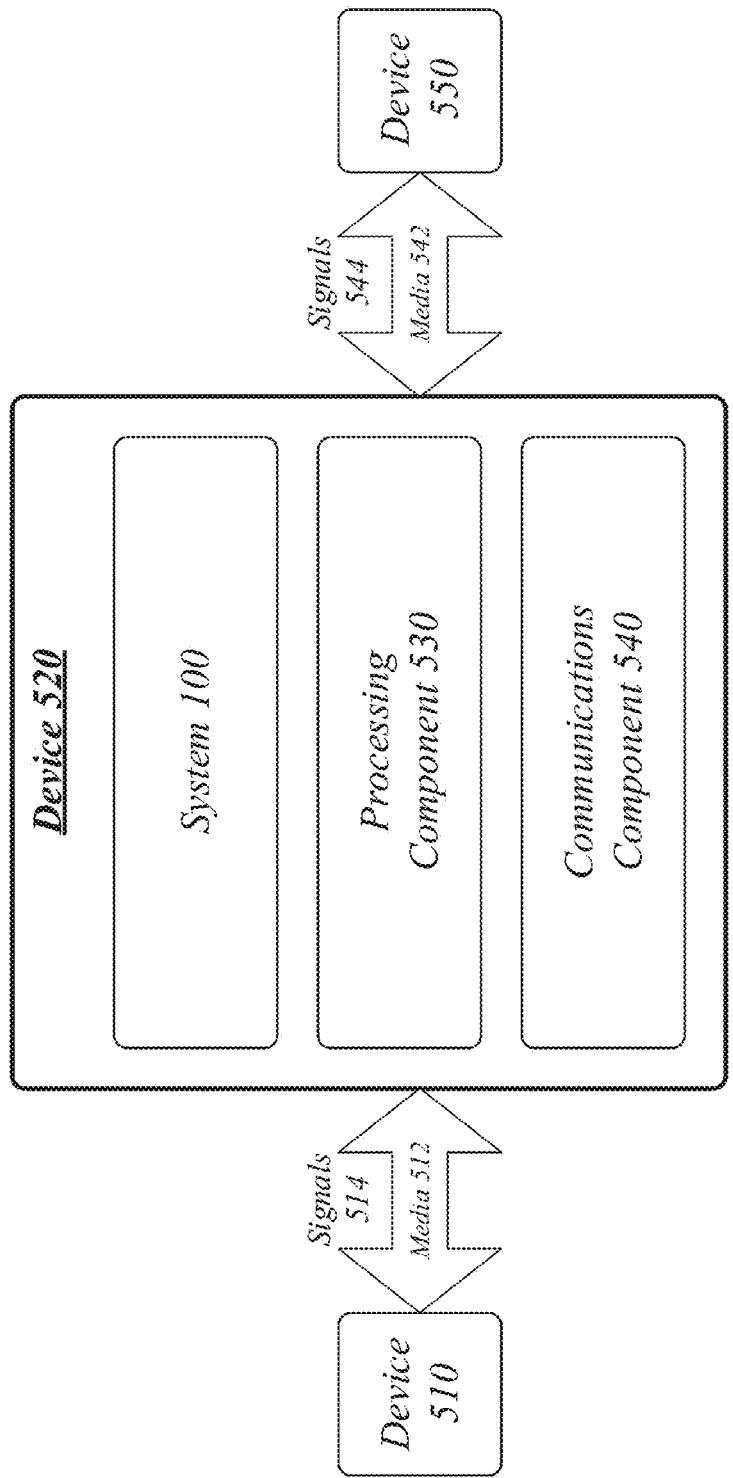
FIG. 5 illustrates an embodiment of a centralized system.

FIG. 5 illustrates a block diagram of a centralized system 500. The centralized system 500 may implement some or all of the structure and/or operations for the disclosed embodiments in a single computing entity, such as entirely within a single device 520.

The device 520 may comprise any electronic device capable of receiving, processing, and sending information for the disclosed embodiments. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 520 may execute processing operations or logic for the disclosed embodiments using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 520 may execute communications operations or logic for the disclosed embodiments using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512, 542 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 520 may communicate with other devices 510, 550 over a communications media 512, 542, respectively, using communications signals 514, 544, respectively, via the communications component 540. The devices 510, 550 may be internal or external to the device 520 as desired for a given implementation.

Figure 6:
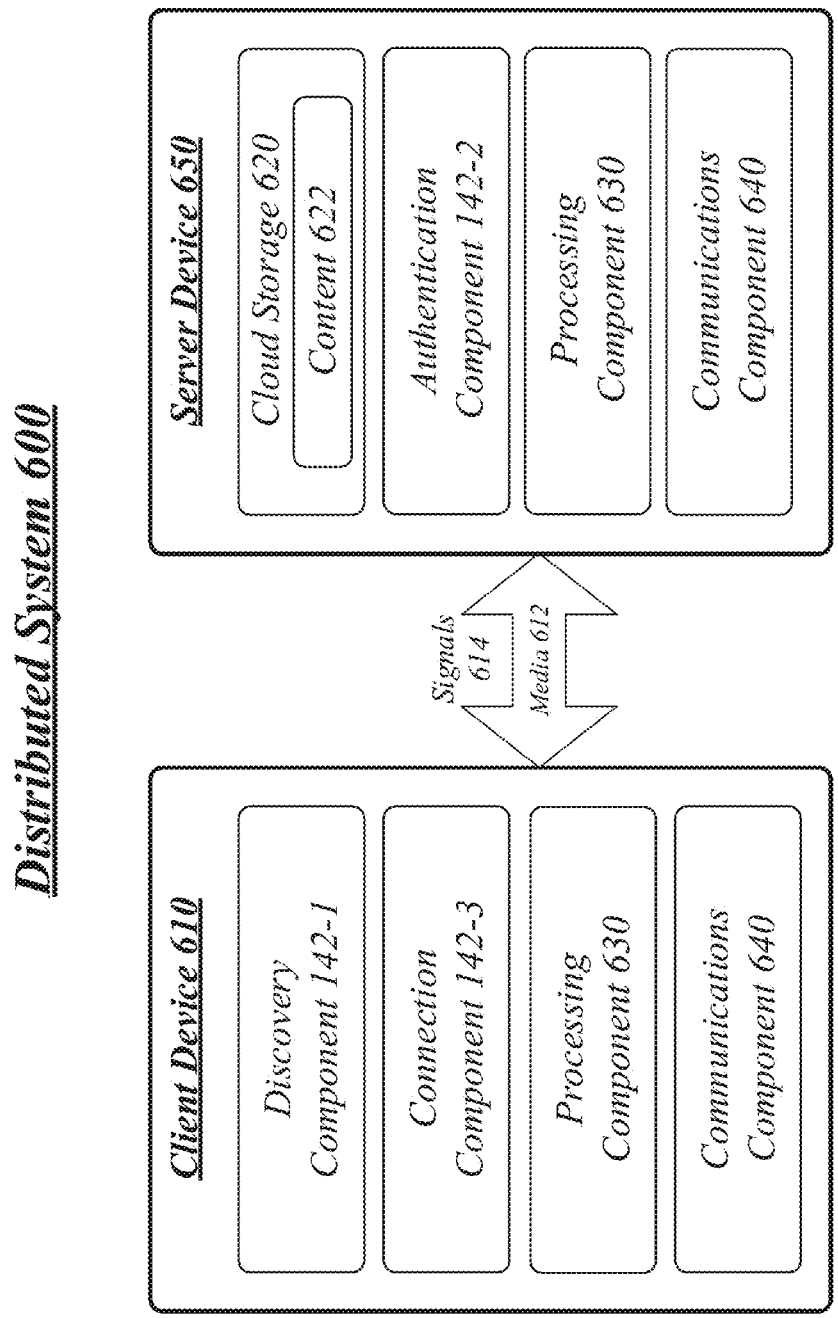
FIG. 6 illustrates an embodiment of a distributed system.

FIG. 6 illustrates a block diagram of a distributed system 600. The distributed system 600 may distribute portions of the structure and/or operations for the disclosed embodiments across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client device 610 and a server device 650. In general, the client device 610 and the server device 650 may be the same or similar to the client device 520 as described with reference to FIG. 5. For instance, the client system 610 and the server system 650 may each comprise a processing component 630 and a communications component 640 which are the same or similar to the processing component 530 and the communications component 540, respectively, as described with reference to FIG. 5. In another example, the devices 610, 650 may communicate over a communications media 612 using communications signals 614 via the communications components 640.

The client device 610 may comprise or employ one or more client programs that operate to perform various methodologies in accordance with the described embodiments. In one embodiment, for example, the client device 610 may implement some steps described with respect to FIGS. 1-4.

The server device 650 may comprise or employ one or more server programs that operate to perform various methodologies in accordance with the described embodiments. In one embodiment, for example, the server device 650 may implement some steps described with respect to FIGS. 1-4.

FIG. 7 illustrates an embodiment of a storage medium 700. The storage medium 700 may comprise an article of manufacture. In one embodiment, the storage medium 700 may comprise any non-transitory, physical, or hardware computer readable medium or machine readable medium, such as an optical, magnetic or semiconductor storage. The storage medium may store various types of computer executable instructions, such as instructions to implement one or more of the logic flows 100, 200, and/or logic 140. Examples of a computer readable or machine readable storage medium may include any tangible media capable of storing electronic data, including physical memory, hardware memory, volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 8:
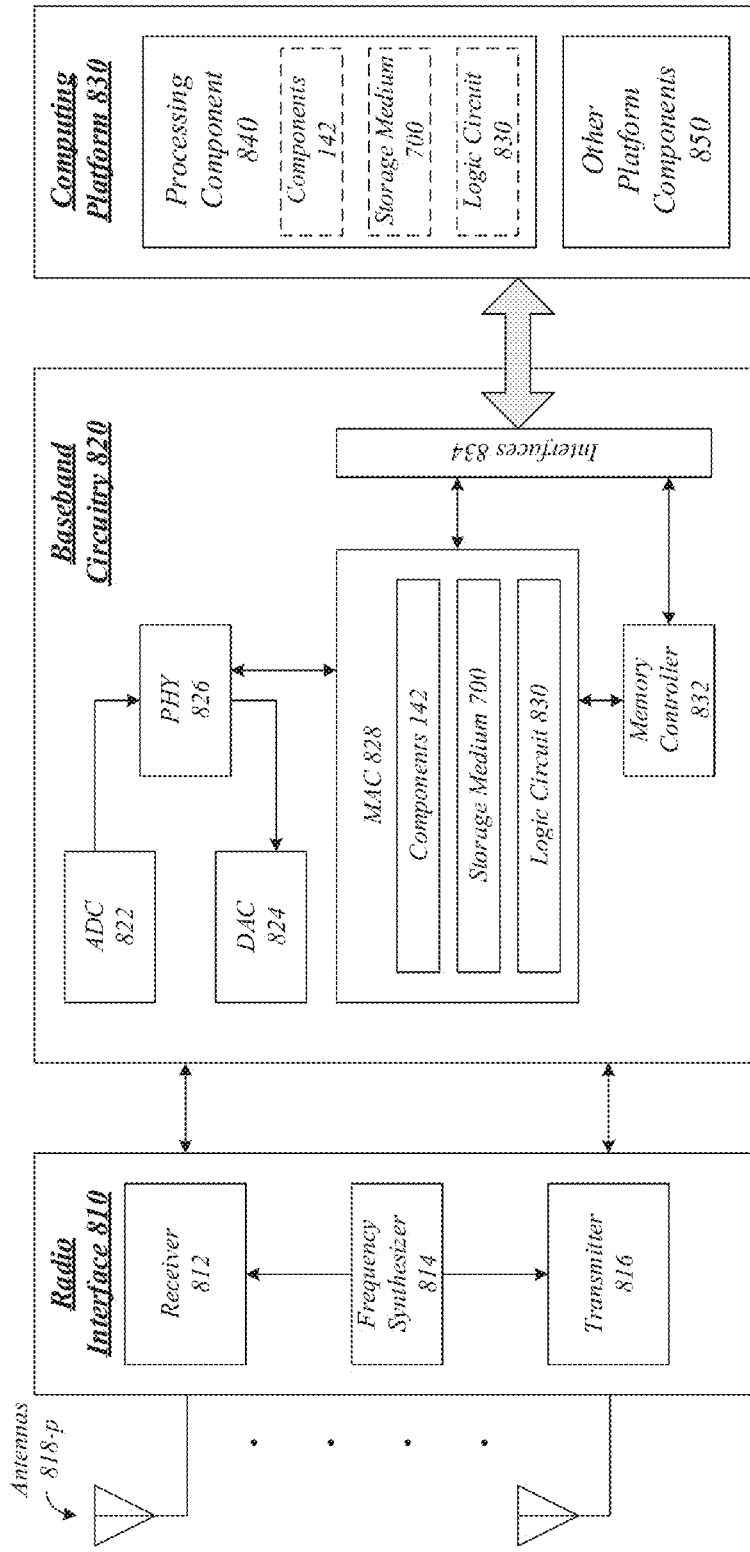
FIG. 8 illustrates an embodiment of a communications architecture.

FIG. 8 illustrates an embodiment of a wireless device 800 for use in a wireless system, such as the wireless network 300. Wireless device 800 may implement, for example, the mobile device 102, mobile device 112, access point 302, device 520, client device 610, storage medium 700 and/or a logic circuit 830. The logic circuit 830 may include physical circuits to perform operations described for the mobile device 102, mobile device 112, access point 302, device 520, client device 610, storage medium 700 and/or a logic circuit 830. As shown in FIG. 8, wireless device 800 may include a radio interface 810, baseband circuitry 820, and computing platform 830, although embodiments are not limited to this configuration.

The wireless device 800 may implement some or all of the structure and/or operations for the mobile device 102, mobile device 112, access point 302, device 520, client device 610, storage medium 700 and/or a logic circuit 830 in a single computing entity, such as entirely within a single device. Alternatively, the wireless device 800 may distribute portions of the structure and/or operations for the mobile device 102, mobile device 112, access point 302, device 520, client device 610, storage medium 700 and/or a logic circuit 830 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 810 may include, for example, a receiver 812, a transmitter 816 and/or a frequency synthesizer 814. Radio interface 810 may include bias controls, a crystal oscillator and/or one or more antennas 818-$p$. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 856 for PHY link layer processing of respective receive/transmit signals. Baseband circuitry 820 may include, for example, a processing circuit 828 for medium access control (MAC)/data link layer processing. Baseband circuitry 820 may include a memory controller 832 for communicating with processing circuit 828 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames, such as radio frames 302-*e*. Alternatively or in addition, MAC processing circuit 828 may share processing for certain of these functions or perform these processes independent of PHY processing circuit 826. In some embodiments, MAC and PHY processing may be integrated into a single circuit.

The computing platform 830 may provide computing functionality for the wireless device 800. As shown, the computing platform 830 may include a processing component 840. In addition to, or alternatively of, the baseband circuitry 820, the wireless device 800 may execute processing operations or logic for the UE 80, base station 800, storage medium 1000, and logic circuit 830 using the processing component 830. The processing component 830 (and/or PHY 826 and/or MAC 828) may comprise various hardware elements, software elements, or a combination of both. Examples of hardware elements may include devices, logic devices, components, processors, microprocessors, circuits, processor circuits (e.g., processor circuits 220, 820), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Wireless device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of wireless device 800 described herein, may be included or omitted in various embodiments of wireless device 800, as suitably desired. In some embodiments, wireless device 800 may be configured to be compatible with protocols and frequencies associated one or more of the IEEE 802.11 Standards, Hotspot 2.0 Standards, 3GPP LTE Specifications and/or IEEE 802.16 Standards for WMANs, and/or other broadband wireless networks, cited herein, although the embodiments are not limited in this respect.

Embodiments of wireless device 800 may be implemented using single input single output (SISO) architectures. However, certain implementations may include multiple antennas (e.g., antennas 818-*p*) for transmission and/or reception using adaptive antenna techniques for beamforming or spatial division multiple access (SDMA) and/or using MIMO communication techniques.

The components and features of wireless device 800 may be implemented using any combination of discrete circuitry, application specific integrated circuits (ASICs), logic gates and/or single chip architectures. Further, the features of wireless device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary wireless device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 9 illustrates an example of a social graph 900. In particular embodiments, a social networking service may store one or more social graphs 900 in one or more data stores. In particular embodiments, social graph 900 may include multiple nodes, which may include multiple user nodes 902 and multiple concept nodes 904. Social graph 900 may include multiple edges 906 connecting the nodes. In particular embodiments, a social networking service, client system, third-party system, or any other system or device may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of the social networking service. As an example and not by way of limitation, a user may be an individual (human user), an entity (e.g., an enterprise, business, or third-party application), or a group (e.g., of individuals or entities) that interacts or communicates with or over the social networking service. In particular embodiments, when a user registers for an account with the social networking service, the social networking service may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with the social networking service. In particular embodiments, a user node 902 may be associated with information provided by a user or information gathered by various systems, including the social networking service. As an example and not by way of limitation, a user may provide their name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social networking service or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including the social networking service. As an example and not by way of limitation, information of a concept may include a name or a title; one or more images (e.g., an image of the cover page of a book); a location (e.g., an address or a geographical location); a website (which may be associated with a URL); contact information (e.g., a phone number, SIM information as described above, or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to the social networking service. Profile pages may also be hosted on third-party websites associated with a third-party server. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social networking service a message indicating the user's action. In response to the message, the social networking service may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, the social networking service may send a "friend request" to the second user. If the second user confirms the "friend request," the social networking service may create an edge 906 connecting the first user's user node 902 to the second user's user node 902 in social graph 900 and store edge 906 as social-graph information in one or more data stores. In the example of FIG. 9, social graph 900 includes an edge 906 indicating a friend relation between user nodes 902 of user "Amanda" and user "Bryan" and an edge indicating a friend relation between user nodes 902 of user "Carla" and user "Bryan." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in a social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, the social networking service may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social networking service may create a "listened" edge 906 and a "used" edge (as illustrated in FIG. 9) between user nodes 902 corresponding to the user and concept nodes 904 corresponding to the song and application to indicate that the user listened to the song and used the application. Moreover, the social networking service may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Across the Sea"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "Edwin" and concept node 904 for "SPOTIFY").

In particular embodiments, the social networking service may create an edge 906 between a user node 902 and a concept node 904 in social graph 900. As an example and not by way of limitation, a user viewing a concept-profile page (such as, for example, by using a web browser or a special-purpose application hosted by the user's client system) may indicate that he or she likes the concept represented by the concept node 904 by clicking or selecting a "Like" icon, which may cause the user's client system to send to the social networking service a message indicating the user's liking of the concept associated with the concept-profile page. In response to the message, the social networking service may create an edge 906 between user node 902 associated with the user and concept node 904, as illustrated by "like" edge 906 between the user and concept node 904. In particular embodiments, the social networking service may store an edge 906 in one or more data stores. In particular embodiments, an edge 906 may be automatically formed by the social networking service in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus.

Various general purpose machines may be used with programs written in accordance with the teachings herein, or it may prove convenient to construct more specialized apparatus to perform the required method steps. The required structure for a variety of these machines will appear from the description given.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

What is claimed is:

1. A computer-implemented method, comprising
    sending, from a first device, an inquiry message using a first protocol during a discovery phase to discover a second device within communications range of the first device, the inquiry message to include social information to identify a user of the first device within a social graph of a social network, the social graph comprising a plurality of nodes and a plurality of edges connecting pairs of nodes wherein the user of the first device is represented by a first node, wherein each edge represents a relationship between a pair of nodes or represents an action of one node in a pair of nodes on the other node in the pair of nodes;
    receiving, by the first device, an inquiry response message from the second device using the first protocol during the discovery phase, the inquiry response message including social information to identify a user of the second device as a second node within the social graph of the social network, and a list of second protocols for use by the second device;
    determining, by a processor circuit of the first device, a number of edges between the first node and the second node and a type of relationship according to the number of edges, wherein the type of relationship is associated with a permission level and a security setting;
    authenticating, by the processor circuit, the second device when the determined type of relationship is a valid relationship between the first and second users;
    adjusting a security setting on the first device according to the security setting of the determined type of relationship; and
    responsive to the authenticating, establishing a peer-to-peer connection between the first and second devices using one of the second protocols during a session phase when a valid relationship is authenticated.

2. The computer-implemented method of claim 1, comprising authenticating the valid relationship between the users when the number of edges identifies a first degree relationship for the users.

3. The computer-implemented method of claim 1, comprising authenticating the valid relationship between the users when the number of edges identifies a second degree relationship for the users.

4. The computer-implemented method of claim 1, comprising receiving the inquiry response message from the second device using the first protocol during the discovery phase, the inquiry response message to include connection information for one or more of the second protocols.

5. The computer-implemented method of claim 1, comprising sending a discovery request message from the first device to the second device using the first protocol during the discovery phase, the discovery request message including a request for connection information for one of the second protocols from the second device.

6. The computer-implemented method of claim 1, comprising receiving, by the first device, a discovery response message from the second device using the first protocol during the discovery phase, the discovery response message including connection information for one of the second protocols from the second device.

7. The computer-implemented method of claim 1, comprising selecting a second protocol from the list of second protocols received from the second device based on one or more selection criteria.

8. The computer-implemented method of claim 1, comprising sending content information from the first device to the second device over the peer-to-peer connection during the session phase.

9. The computer-implemented method of claim 1, comprising receiving content information from the second device by the first device over the peer-to-peer connection during the session phase.

10. The computer-implemented method of claim 1, comprising terminating the peer-to-peer connection when a terminating condition is met.

11. An apparatus, comprising
    a processor circuit;
    a first radio coupled to the processor circuit; and
    a discovery component operative on the processor circuit to discover a remote device using a first protocol, and receive discovery information from the remote device, the discovery information including social information and protocol information, the social information to identify a user of the remote device within a social graph of a social network, the social graph comprising a plurality of nodes and a plurality of edges connecting pairs of nodes wherein a user of the remote device is represented by a first node and wherein a user of the apparatus is represented by a second node, wherein each edge represents a relationship between a pair of nodes or represents an action of one node in a pair of nodes on the other node in the pair of nodes, and the protocol information comprising a list of second protocols for use by the remote device;
    an authentication component operative on the processor circuit to determine a number of edges between the first node and the second node and a type of relationship according to the number of edges, wherein the type of relationship is associated with a permission level and a security setting, to authenticate the second device when the determined type of relationship is a valid relationship with the user of the remote device, and to adjust a security setting on the first device according to the security setting of the determined type of relationship; and a connection component operative on the processor circuit to establish a peer-to-peer connection with the remote device using a second protocol based on the protocol information when a valid relationship is authenticated.

12. The apparatus of claim 11, wherein the first radio is configured to communicate with the remote device using the first protocol during a discovery phase, and communicate with the remote device using the second protocol during a session phase.

13. The apparatus of claim 11, further comprising a second radio coupled to the processor circuit, the first radio configured to communicate with the remote device using the first protocol during a discovery phase, the second radio configured to communicate with the remote device using the second protocol during a session phase.

14. The apparatus of claim 11, wherein the discovery information includes connection information for the second protocol.

15. The apparatus of claim 11, further comprising at least one antenna coupled to the first radio, the antenna configured to transmit electromagnetic signals for a beacon to discover the remote device using the first protocol.

16. The apparatus of claim 11, further comprising a memory unit, a memory controller coupled to the memory unit, and a touch screen display coupled to the memory unit and the processor circuit.

17. At least one non-transitory computer-readable storage medium comprising instructions that, when executed, cause a system to:

discover a remote device using a first protocol, and retrieve discovery information from the remote device, the discovery information including social information and protocol information, the social information to identify a user of the remote device within a social graph of a social network, the social graph comprising a plurality of nodes and a plurality of edges connecting pairs of nodes wherein a user of the remote device is represented by a first node and wherein a user of the system is represented by a second node, wherein each edge represents a relationship between a pair of nodes or represents an action of one node in a pair of nodes on the other node in the pair of nodes, and the protocol information comprising a list of second protocols for use by the remote device;

determine a number of edges between the first node and the second node and a type of relationship according to the number of edges, wherein the type of relationship is associated with a permission level and a security setting;

authenticate the second device when the determined type of relationship is a valid relationship between the first and second users;

adjust a security setting on the first device according to the security setting of the determined type of relationship; and establish a peer-to-peer connection with the remote device using a second protocol based on the protocol information when a valid relationship is authenticated, the peer-to-peer connection established.

18. The computer-readable storage medium of claim 17, further comprising instructions to authenticate a valid relationship when the social graph of the social network identifies a first degree relationship with the user of the remote device.

19. The computer-readable storage medium of claim 17, further comprising instructions that when executed cause the system to retrieve an identifier for the second protocol and associated connection information from the protocol information, and establish the peer-to-peer connection with the remote device with the second protocol based on the identifier and connection information.

20. The computer-readable storage medium of claim 17, further comprising instructions that when executed cause the system to cause transmission of content information to the remote device over the peer-to-peer connection during a session phase.

* * * * *